Patented June 18, 1946

2,402,243

UNITED STATES PATENT OFFICE 2,402,243

MANUFACTURE OF STYRENE

Gustav Egloff, Chicago, Ill., assignor to Universal Oil Products Company, Chicago, Ill., a corporation of Delaware No Drawing. Application February 11, 1942, Serial No. 430,480

6 Claims. (Cl. 260—669)

This invention is concerned with a process for the manufacture of styrene by the interaction of benzene and acetylene in the presence of catalysts.

It is more specifically concerned with the use of catalysts of the Friedel-Crafts type whose catalytic activity has been modified to permit better control of the type of reactions occurring. The invention is further characterized by a specific mode of operation which permits accurate control of temperature, pressure and times of catalytic contact.

The compound styrene having the formula $C_6H_5 \cdot C_2H_3$ and typifying an aryl substituted mono-olefin, in this case phenylethylene, is at the present time of considerable industrial importance particularly in connection with the formation of resinous polymers of high molecular weight and the production of rubber-like materials when it is copolymerized with butadiene and other conjugated diolefins. Styrene is obtained as a byproduct in the coal tar industry and in small amounts in the products of high temperature pyrolysis of hydrocarbons and it can also be made by both thermal cracking and catalytic dehydrogenation of ethylbenzene. The process of the present invention constitutes an improvement over these previously known and utilized processes in that the desired product is made in a single step instead of a series of operations.

In one specific embodiment the present invention comprises a process for the manufacture of styrene which consists in subjecting benzene to interaction with acetylene in the presence of supported catalysts of the Friedel-Crafts type, the reactions being brought about by passing mixtures of benzene and acetylene in regulated proportions over granular catalysts at relatively high rates so that short times of catalytic contact are made possible.

The principal reaction which has heretofore been observed when benzene and acetylene are caused to react in the presence of catalysts has been the formation of diphenylethane according to the following equation:

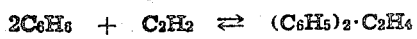

Benzene   acetylene   Diphenylethane

The evidence at hand indicated the probability that styrene is an intermediate product in this reaction and it has been found in accordance with the present invention that, by accurately controlling the time of reaction in the presence of the preferred catalysts, styrene may be produced in good yields. The reaction occurring under the preferred conditions of the present invention is given by the following equation:

$$C_6H_6 + C_2H_2 \rightleftarrows C_6H_5 \cdot C_2H_3$$

By the suitable manipulation of the time factor the polymerization of the styrene is minimized so that it can be recovered as such.

In accordance with the precepts of the present invention Friedel-Crafts catalysts are employed on various granular supports and the catalysts are contained in reactors through which benzene and acetylene are passed at carefully controlled rates. Friedel-Crafts catalysts include, as the members most effective in hydrocarbon conversion reactions aluminum chloride, zinc chloride, ferric chloride and zirconium chloride. Other catalysts in this group of lesser effectiveness include chlorides of arsenic, antimony and bismuth which are not usually suitable in themselves for effecting hydrocarbon conversion reactions. These compounds of lesser catalytic activity may, however, be used in admixture with the more active members of the group to modify their activity and other metal halides having substantially no catalytic activity in hydrocarbon conversion reactions such as, for example, the halides of the alkali metals and alkaline earth metals may also be used along with the active catalysts in the alternately utilizable composites. While the chlorides are generally preferred on account of their activity, cheapness and ready availability, the invention is not limited to the use of chlorides but may include the use of bromides and iodides.

In accordance with the present invention the active catalysts either alone or in admixture with less active compounds are employed on granular supports which include a number of substances of varying physical and chemical properties. Among supports which may be utilized may be mentioned the various forms of alumina including the mineral bauxite and prepared materials made by heating bauxite or other hydrated aluminas to a definite degree of hydration, activated carbons, clays both raw and acid treated such as, for example, those of the montmorillonite and bentonite type, silica-alumina composites prepared by the precipitation of the gels followed by heating and calcining and other materials such as kieselguhr, pumice and ground refractories. The suitability of such relatively inert materials as supports for the active catalysts will depend upon such factors as their chemical composition, their degree of hydration, their porosity and mechanical strength and their tendency to react and form complexes with the active catalysts. Alumina prepared by the calcination of bauxite or precipitated hydrated aluminas at temperatures of from about 400 to about 500° C. are particularly good supports for the active catalysts, and activated carbons and prepared silica-alumina composites are also particularly good.

The supported catalysts may be made by any desired procedure such as, for example, by heating in a closed pressure vessel the amounts of granular support and metal halides found to give catalysts of good activity. For example, proportioned amounts of prepared granular alumina and aluminum chloride may be placed in a pressure vessel to which hydrogen chloride and/or hydrogen may also be added and the contents heated to sublime the aluminum chloride into the pores of the absorbent alumina. Another mode of manufacture may consist in passing the vapors of aluminum chloride through a stationary bed of granular alumina or other alternate support until the aluminum chloride has substantially saturated the absorptive capacity of the support, after which the material thus prepared can be used in situ for effecting the reactions of the process.

When utilizing other active halides such as those of zinc, iron and zirconium, similar modes of impregnation may be resorted to although in some instances the impregnation may be better effected by contacting the molten halides with the granular absorbent. When more than one metal halide is employed on the supports, they may be added simultaneously or successively according to whatever method is found to produce the best catalyst. Obviously, by the alternate use of the different active metal halides and their mixtures with or without additions of relatively inert halides, a large number of alternately utilizable catalysts are made possible but, obviously, they will not exert equivalent catalytic activity in promoting the type of reaction which characterizes the process of the invention. While amounts of active and/or relatively inactive metal halides may be used short of saturation of the supports, it is common practice to use the catalyst on absorptive granular material which is substantially completely saturated with the metal halides at temperatures chosen for the reactions of the process.

The temperature range suitable for effecting the interaction of benzene and acetylene to produce substantial yields of styrene when utilizing the preferred supported catalysts may vary from about 0 to about 150° C. under atmospheric or slightly superatmospheric pressures. As a rule, in the case of aluminum chloride catalysts, the times of contact should be kept below 5 seconds and, in most instances, they will be of the order of 2 seconds or less. These approximate ranges of conditions will vary with the exact types of catalysts employed. As to proportions of benzene and acetylene, it is advisable to maintain an excess of benzene, the mol ratio of benzene to acetylene varying from 2:1 to 20:1.

In the preferred operation of the process a mixture of benzene and acetylene in substantially vapor phase is passed through a bed of granular catalyst contained in a reactor and the products are then fractionated to recover the desired aryl mono-olefin such as styrene. If desired, the benzene vapors may be passed through a bed of catalyst while the acetylene is introduced at successive points along the line of flow. To further assist in the control of the reaction, hydrogen chloride and/or hydrogen may be introduced into the reaction zone. After fractionation the unconverted materials may be recycled for further use in admixture with fresh charging stocks.

The following example is introduced to indicate the type of results which may be expected in the production of styrene by the present process but it is not intended that the proper scope shall be exactly limited thereby.

A mixture of benzene and acetylene vapors in the approximate molecular proportions of five to one is passed through a bed of catalyst consisting of aluminum chloride absorbed in the pores of granular bauxite previously calcined at a temperature of 500° C., the aluminum chloride constituting 20 per cent by weight of the composite. A volume of hydrogen equal to the volume of benzene and acetylene vapors is employed and the temperature in the reaction zone is maintained at 90° C. A yield of styrene equal to 20 per cent of that corresponding to the theoretical is obtained in a single pass and by recycling unconverted benzene and acetylene the ultimate yield is raised to 45 per cent.

I claim as my invention:

1. A process for the manufacture of styrene which comprises subjecting a mixture of benzene and acetylene at a temperature of from about 0 to about 150° C. to contact with a catalyst composite consisting of aluminum chloride and a relatively inert granular porous support for a time not exceeding five seconds.

2. A process for the manufacture of styrene which comprises subjecting a mixture of benzene and acetylene at a temperature of from about 0 to about 150° C. to contact with a catalyst composite consisting of aluminum chloride and alumina for a time not exceeding five seconds.

3. A process for the manufacture of styrene which comprises subjecting a mixture of benzene and acetylene at a temperature of from about 0 to about 150° C. to contact with a catalyst composite consisting of aluminum chloride and activated carbon for a time not exceeding five seconds.

4. A process for the manufacture of styrene which comprises reacting benzene with acetylene in the presence of a composite of a Friedel-Crafts metal halide catalyst and a relatively inert granular porous support at a temperature of from about 0° C. to about 150° C. and for a contact time not in excess of five seconds.

5. The process of claim 4 wherein said halide comprises zinc chloride.

6. The process of claim 4 further characterized in that benzene and acetylene are subjected to contact with said catalyst at a mol ratio of benzene to acetylene of from 2:1 to 20:1.

GUSTAV EGLOFF.